United States Patent
Imagawa

(10) Patent No.: US 10,733,751 B2
(45) Date of Patent: Aug. 4, 2020

(54) DISPLACEMENT DETECTING APPARATUS AND DISPLACEMENT DETECTING METHOD

(71) Applicant: Panasonic Intellectual Property Management Co., Ltd., Osaka (JP)

(72) Inventor: Taro Imagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/385,646

(22) Filed: Apr. 16, 2019

(65) Prior Publication Data

US 2019/0244381 A1    Aug. 8, 2019

Related U.S. Application Data

(62) Division of application No. 16/044,754, filed on Jul. 25, 2018, now Pat. No. 10,311,591, which is a
(Continued)

(30) Foreign Application Priority Data

Feb. 24, 2016  (JP) .................. 2016-032648
May 27, 2016  (JP) .................. 2016-105988
Nov. 11, 2016  (JP) .................. 2016-220944

(51) Int. Cl.
*G06T 7/60*  (2017.01)
*G06T 7/246*  (2017.01)
(Continued)

(52) U.S. Cl.
CPC .............. *G06T 7/60* (2013.01); *G06T 7/246* (2017.01); *G06T 7/70* (2017.01); *G06T 7/73* (2017.01);
(Continued)

(58) Field of Classification Search
CPC .. G06T 7/60; G06T 7/70; G06T 7/246; G06T 7/73; G06T 2207/10004; G06T 2207/10016; G06T 7/20; G06T 7/0042
See application file for complete search history.

(56) References Cited

U.S. PATENT DOCUMENTS 10,330,465 B2 *  6/2019  Byrne .................... G01B 11/16
2009/0073428 A1 *  3/2009  Magnus .................... B61K 9/08
                                                                        356/237.1
(Continued)

FOREIGN PATENT DOCUMENTS

JP        2015-141151         8/2015

*Primary Examiner* — Wesley J Tucker
(74) *Attorney, Agent, or Firm* — Wenderoth, Lind & Ponack, L.L.P.

(57) ABSTRACT

A displacement detecting apparatus includes: a detector which detects displacement, which is spatial displacement over time, of each of a plurality of measurement points which have been set on an object, using a plurality of images of the object captured at a plurality of time points; an extractor which extracts characteristic displacement specific to the object, based on the displacement detected by the detector; and a calculator which calculates overall displacement indicating displacement of the entirety of the object, from the characteristic displacement extracted by the extractor.

11 Claims, 13 Drawing Sheets

Related U.S. Application Data division of application No. 15/352,907, filed on Nov. 16, 2016, now Pat. No. 10,062,176.

(51) Int. Cl.
*G06T 7/73* (2017.01)
*G06T 7/70* (2017.01)

(52) U.S. Cl.
CPC .............. *G06T 2207/10004* (2013.01); *G06T 2207/10016* (2013.01)

(56) References Cited

U.S. PATENT DOCUMENTS

| | | | |
|---|---|---|---|
| 2011/0199461 A1* | 8/2011 | Horio | G06T 7/20 348/46 |
| 2013/0063570 A1* | 3/2013 | Michopoulos | G01B 11/165 348/47 |
| 2013/0201311 A1* | 8/2013 | Hirakawa | A61B 1/00071 348/74 |
| 2016/0086322 A1 | 3/2016 | Arita et al. | |
| 2017/0307360 A1 | 10/2017 | Imai | |
| 2018/0209883 A1* | 7/2018 | Imagawa | G01N 3/28 |
| 2018/0249058 A1 | 8/2018 | Imagawa et al. | |
| 2019/0226904 A1* | 7/2019 | Imagawa | G01G 19/024 |
| 2019/0265020 A1* | 8/2019 | Noda | G06T 7/62 |
| 2020/0046316 A1* | 2/2020 | Maeda | A61B 8/461 |

* cited by examiner

FIG. 8

|     | FRAME 1    | FRAME 2    | FRAME 3    | ...  | FRAME n |
|-----|------------|------------|------------|------|---------|
| 501 | (000, 000) | (001, 000) | (000, 001) | ...  |         |
| 502 | (000, 000) | (001, -001)| (002, 000) | ...  |         |
| 503 | (000, 000) | (004, -002)| (006, -004)| ...  |         |
| 504 | (000, 000) |            |            | ...  |         |
| 504 | (000, 000) |            |            | ...  |         |
| 506 | (000, 000) |            |            | ...  |         |
| 507 | (000, 000) |            |            | ...  |         |
| 508 | (000, 000) |            |            | ...  |         |
| 509 | (000, 000) |            |            | ...  |         |
| 510 | (000, 000) |            |            | ...  |         |
| 511 | (000, 000) |            |            | ...  |         |

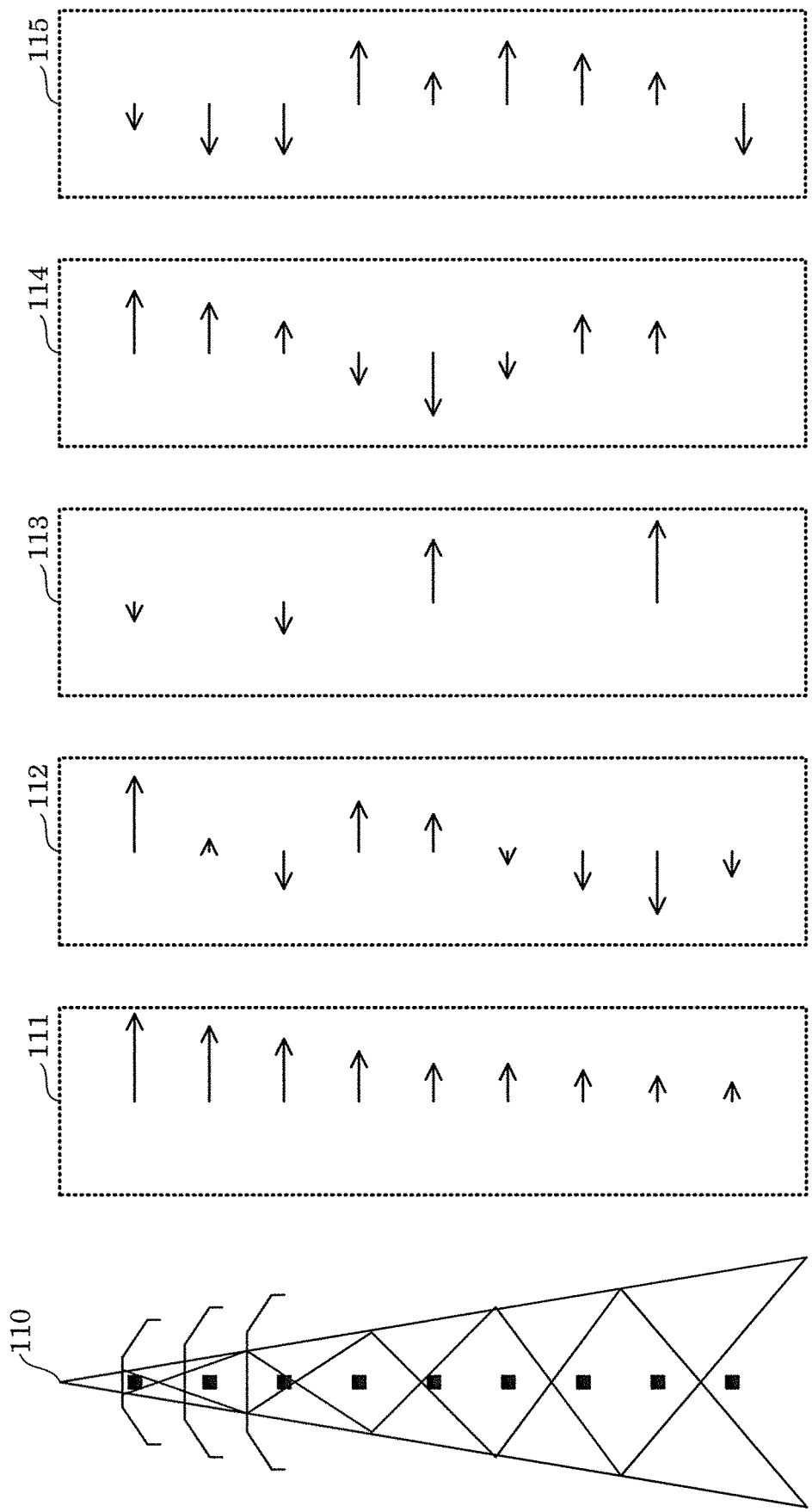

DISPLACEMENT DETECTING APPARATUS AND DISPLACEMENT DETECTING METHOD

CROSS REFERENCE TO RELATED APPLICATION

This application claims the benefit of priority of Japanese Patent Application Numbers 2016-032648 filed on Feb. 24, 2016, 2016-105988 filed on May 27, 2016, and 2016-220944 filed on Nov. 11, 2016, the entire content of which is hereby incorporated by reference.

BACKGROUND

1. Technical Field

The present disclosure relates to a displacement detecting apparatus and a displacement detecting method for detecting displacement of an object to be measured.

2. Description of the Related Art

Japanese Unexamined Patent Application Publication No. 2015-141151 (Patent Literature 1) discloses forming a plurality of grid patterns on the object to be measured, capturing images of the object to be measured at predetermined time intervals, and calculating temporal displacement of each of the grid patterns in the captured images, so as to obtain displacement at each of a plurality of points from a single image sequence.

SUMMARY

The present disclosure provides a displacement detecting apparatus which detects overall displacement of an object from captured images of the object.

A displacement detecting apparatus according to the present disclosure includes: a detector which detects displacement, which is spatial displacement over time, of each of a plurality of measurement points which have been set on an object, using a plurality of images of the object captured at a plurality of time points; an extractor which extracts characteristic displacement specific to the object, based on the displacement detected by the detector; and a calculator which calculates overall displacement indicating displacement of the entirety of the object, from the characteristic displacement extracted by the extractor.

A displacement detecting method according to the present disclosure is performed by a displacement detecting apparatus including a detector, an extractor, and a calculator. The displacement detecting method includes: detecting, by the detector, displacement, which is spatial displacement over time, of each of a plurality of measurement points which have been set on an object, using a plurality of images of the object captured at a plurality of time points; extracting, by the extractor, characteristic displacement specific to the object, based on the displacement detected in the detecting; and calculating, by the calculator, overall displacement indicating displacement of the entirety of the object, from the characteristic displacement extracted in the extracting.

The displacement detecting apparatus and the displacement detecting method according to the present disclosure make it possible to detect overall displacement of the object from the captured images of the object.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 8 is a diagram indicating examples of displacement detected by a detector of the displacement detecting apparatus according to the embodiment;

FIG. 11 is a diagram illustrating an example of visualized five kinds of principal components in the case where the object is an electricity-transmitting steel tower.

DETAILED DESCRIPTION OF THE EMBODIMENTS

Figure 1:
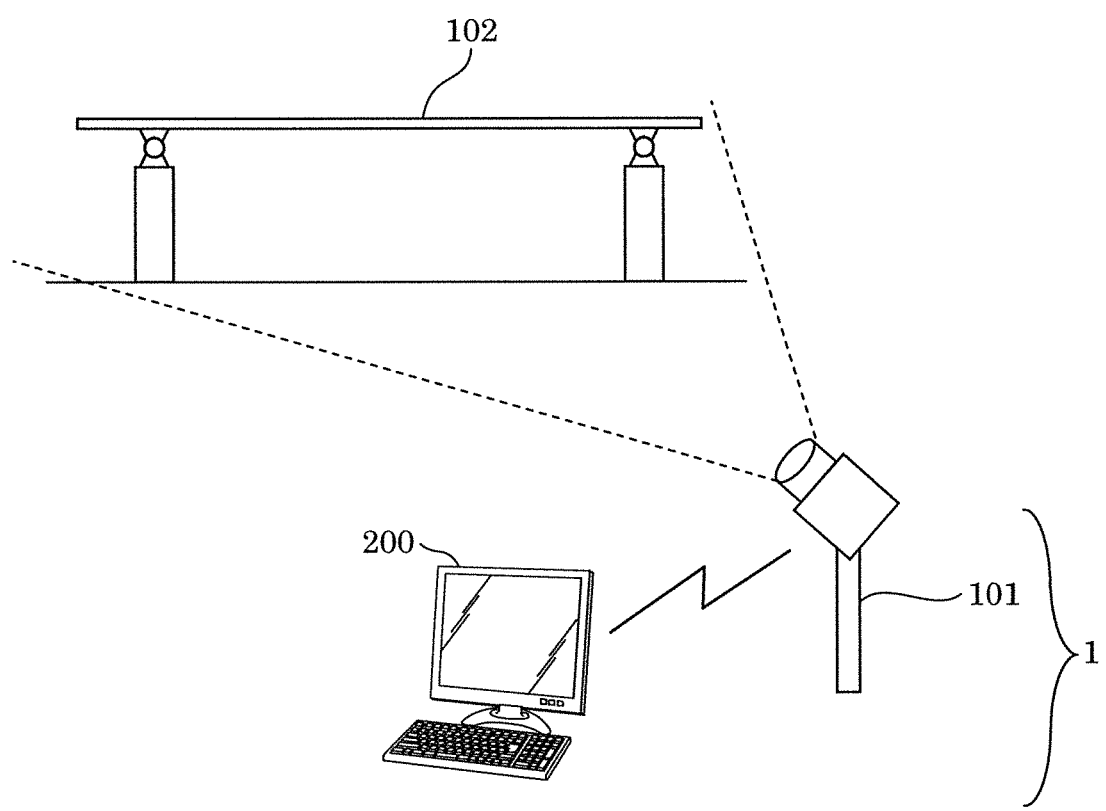
FIG. 1 is an external view of an example of a configuration of a displacement detecting system according to an embodiment.

A displacement detecting apparatus according to an aspect of the present disclosure includes: a detector which detects displacement, which is spatial displacement over time, of each of a plurality of measurement points which have been set on an object, using a plurality of images of the object captured at a plurality of time points; an extractor which extracts characteristic displacement specific to the object, based on the displacement detected by the detector; and a calculator which calculates overall displacement indicating displacement of the entirety of the object, from the characteristic displacement extracted by the extractor.

The displacement detecting apparatus is capable of detecting displacement of the entirety of the object.

Furthermore, for example, the extractor may perform the extraction by extracting one or more principal components through principal component analysis on the displacement detected by the detector.

In this way, the displacement detecting apparatus can represent the characteristic displacement extracted by the extractor, in the form of physical quantities having no linear correlation therebetween.

Furthermore, for example, the calculator may perform the calculation by synthesizing at least two of the one or more principal components except for at least one lowermost principal component in descending order of magnitude of eigen values.

In this way, the displacement detecting apparatus can change the calculated overall displacement to a physical quantity from which non-principal components that are noise components have been removed.

Furthermore, for example, the calculator may perform the calculation by calculating variation in temporal strength of each of the principal components to be calculated.

In this way, the displacement detecting apparatus can change the calculated overall displacement to a physical quantity which is helpful for analyzing a vibration mode regarding the object.

Furthermore, for example, the calculator may perform the calculation by calculating frequency characteristics of variation in temporal strength of each of the principal components to be calculated.

In this way, the displacement detecting apparatus can change the calculated overall displacement to a physical quantity which is helpful for analyzing the frequency of vibration regarding the object.

For example, the displacement detecting apparatus may further include a corrector which corrects the displacement of each of the plurality of measurement points detected by the detector, based on at least one reference measurement point included in the plurality of measurement points. The extractor may perform the extraction, based on the displacement corrected by the corrector.

In this way, the displacement detecting apparatus can correct influence of shake of the imaging apparatus used in the imaging.

Furthermore, for example, the detector may detect, as the displacement, displacement of the object in the plurality of captured images. The displacement detecting apparatus may further include a scaler which rescales the displacement of each of the plurality of measurement points detected by the detector, so as to reflect a ratio of distance of actual displacement between the plurality of measurement points. The calculator may perform the calculation, based on the displacement rescaled by the scaler.

In this way, the displacement detecting apparatus can calculate the overall displacement more accurately.

Furthermore, for example, each of the plurality of captured images may be an acceleration image indicating acceleration, the detector may perform the detection so that displacement to be detected is represented using the acceleration, and the extractor may perform the extraction so that characteristic displacement to be extracted is represented using the acceleration.

In this way, the displacement detecting apparatus can change the calculated overall displacement to a physical quantity which is helpful for analyzing the distribution of spatial acceleration of the entirety of the object.

Furthermore, for example, each of the plurality of captured images may be a speed image indicating speed, the detector may perform the detection so that displacement to be detected is represented using the speed, and the extractor may perform the extraction so that characteristic displacement to be extracted is represented using the speed.

In this way, the displacement detecting apparatus can change the calculated overall displacement to a physical quantity which is helpful for analyzing the distribution of spatial speed of the entirety of the object.

Furthermore, for example, each of the plurality of captured images may be a distance image indicating a distance, and the detector may detect displacement in a three-dimensional space as the displacement.

In this way, the displacement detecting apparatus can change the calculated overall displacement to a physical quantity which is helpful for analyzing the three-dimensional displacement of the entirety of the object.

For example, the displacement detecting apparatus may further include a superimposed image generator which generates a superimposed image in which an image based on the displacement calculated by the calculator is superimposed onto at least one of the plurality of captured images.

In this way, a user who uses the displacement detecting apparatus can visually recognize the overall displacement of the object.

Furthermore, for example, the plurality of captured images may include images of the object captured synchronously by a plurality of imaging apparatuses.

In this way, the displacement detecting apparatus can calculate the overall displacement on the object whose images cannot be captured by a single camera due to the shape or range of the object.

A displacement detecting method according to an aspect of the present disclosure is performed by a displacement detecting apparatus including a detector, an extractor, and a calculator. The displacement detecting method includes: detecting, by the detector, displacement, which is spatial displacement over time, of each of a plurality of measurement points which have been set on an object, using a plurality of images of the object captured at a plurality of time points; extracting, by the extractor, characteristic displacement specific to the object, based on the displacement detected in the detecting; and calculating, by the calculator, overall displacement indicating displacement of the entirety of the object, from the characteristic displacement extracted in the extracting.

According to the displacement detecting method, it is possible to detect displacement of the entirety of the object.

Hereinafter, an embodiment is described referring to the drawings as necessary. It should be noted that unnecessarily detailed explanation may not be provided. For example, well-known matters may not be explained in detail, and substantially the same constituent elements may not be repeatedly explained. Such explanation is omitted to prevent the following explanation from being unnecessarily redundant, thereby facilitating the understanding of a person skilled in the art.

It should be noted that the following explanation and the attached drawings are provided to allow a person skilled in the art to fully appreciate the present disclosure, and thus the explanation and drawings should not be interpreted as limiting the scope of the claims.

Embodiment

Hereinafter, an embodiment is described with reference to FIGS. 1 to 9.

[1-1. Configuration]

[1-1-1. Capturing Images of an Object]

FIG. 1 is an external view of an example of a configuration of displacement detecting system 1 according to this embodiment. Displacement detecting system 1 is configured with imaging apparatus 101 and displacement detecting apparatus 200. Imaging apparatus 101 captures images of object 102 a plurality of times in a predetermined period. Imaging apparatus 101 captures images of object 102 at predetermined time intervals, for example. The images captured by imaging apparatus 101 are input to displacement detecting apparatus 200. Displacement detecting apparatus 200 calculates overall displacement indicating displacement of the entirety of object 102, from the plurality of input captured images. In this embodiment, descriptions are given of taking, as an example, a case where imaging apparatus 101 is a camera, and object 102 is a bridge.

[1-1-2. Configuration of the Displacement Detecting Apparatus]

Figure 2:
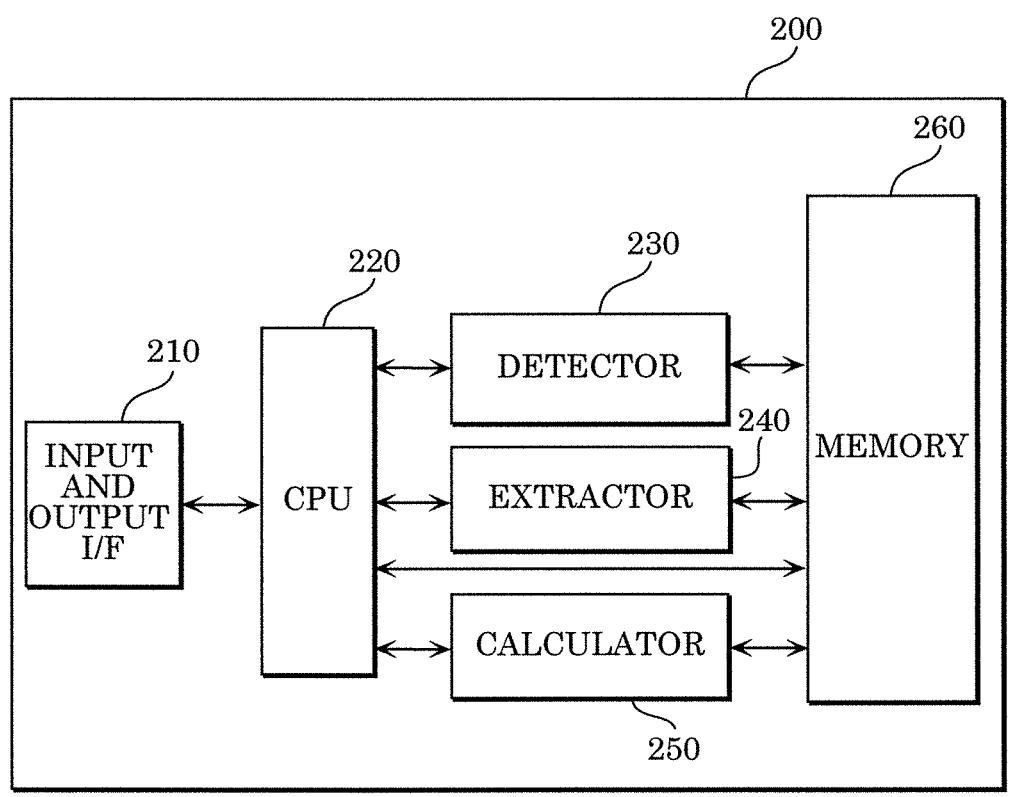
FIG. 2 is a block diagram of an example of a configuration of a displacement detecting apparatus according to the embodiment.

FIG. 2 is a block diagram indicating an example of a configuration of displacement detecting apparatus 200 according to this embodiment. As illustrated in FIG. 2, displacement detecting apparatus 200 includes input and output I/F 210, CPU 220, detector 230, extractor 240, calculator 250, and memory 260.

Input and output I/F 210 receives inputs of images of bridge 102 captured in a predetermined period. Next, input and output I/F 210 outputs the overall displacement of entire bridge 102 calculated by calculator 250. Input and output I/F 210 receives the inputs of the images captured by camera 101 wirelessly, wired, or via a storage medium or the like, and stores the captured images in memory 260. In addition, input and output I/F 210 outputs, to a display unit (not illustrated in the drawings), the overall displacement of entire bridge 102 calculated by calculator 250 wirelessly, wired, or via a storage medium or the like. The display unit displays the overall displacement output from displacement detecting apparatus 200.

CPU 220 controls operations of the respective units. CPU 220 includes, for example, a non-volatile memory having a program stored therein, a volatile memory which is a transitory storage area for executing the program, an input and output port, a processor for executing the program, and so on.

Detector 230 detects displacement of each of a plurality of measurement points which have been set on an object, using a plurality of images of the object captured at a plurality of time points. The displacement is spatial displacement over time. More specifically, detector 230 detects bridge 102 in each of the images captured by camera 101 and stored in memory 260. Next, detector 230 detects displacement which is spatial displacement at each of the plurality of measurement points set on bridge 102, and stores the displacement in memory 260.

Extractor 240 extracts characteristic displacement specific to the object, based on the displacement detected by detector 230. More specifically, extractor 240 extracts spatial principal components which are spatially displaced at the same time through principal component analysis (PCA) on displacement at the plurality of time points obtained at the plurality of measurement points, and stores the spatial principal components in memory 260.

Calculator 250 calculates the overall displacement of the entirety of the object, based on the characteristic displacement extracted by extractor 240. More specifically, calculator 250 calculates the overall displacement of bridge 102 based at least on one of the principal components extracted by extractor 240, and stores the overall displacement in memory 260. Here, it is assumed that calculator 250 performs the calculation by synthesizing five kinds of principal components at the uppermost side among the principal components extracted by extractor 240.

Memory 260 stores captured images input via input and output I/F 210. In addition, memory 260 is used as working memory of each unit. For example, memory 260 stores displacement detected by detector 230. Memory 260 stores principal components extracted by extractor 240. Memory 260 stores the overall displacement of entire bridge 102 calculated by calculator 250. Memory 260 is configured with, for example, a semiconductor storage element capable of performing fast operation such as DRAM.

[1-1-3. Configuration of Another Displacement Detecting Apparatus]

Bridge 102 is not always present at the same position in the plurality of images captured by camera 101. In such a case, displacement detected by detector 230 is erroneous. In order to prevent such an error, the other displacement detecting apparatus may include a function for correcting such displacement detected by detector 230.

Figure 3:
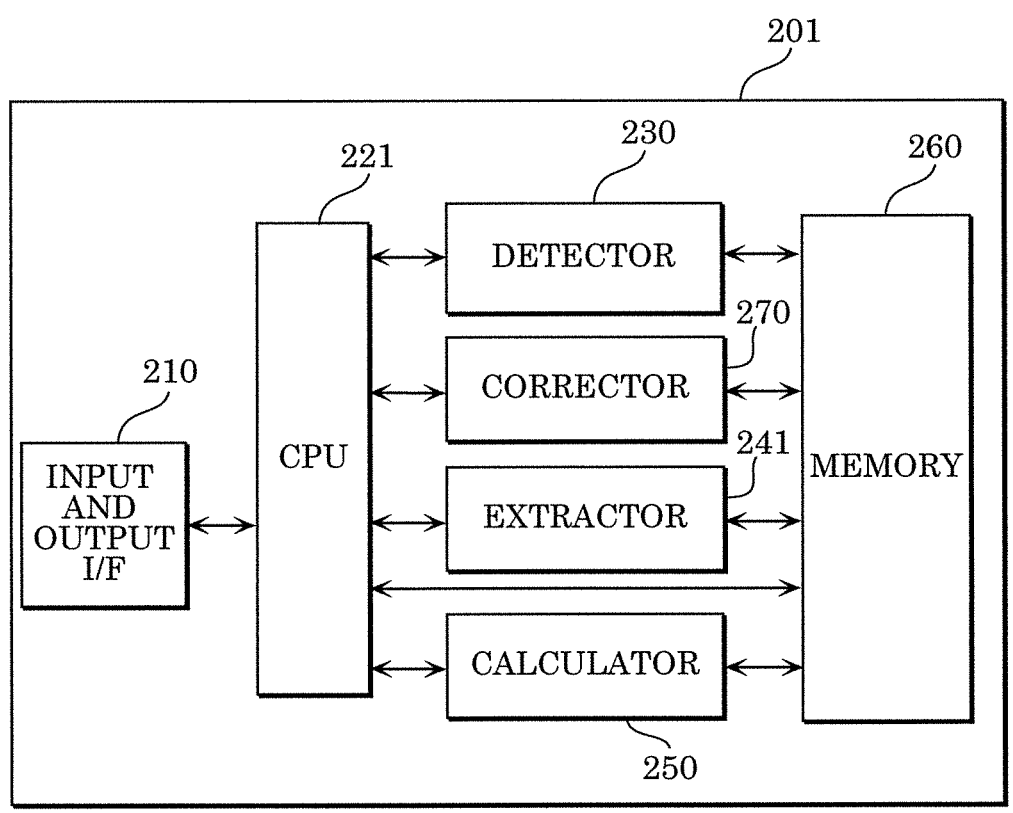
FIG. 3 is a block diagram of an example of a configuration of another displacement detecting apparatus according to the embodiment.

FIG. 3 is a block diagram indicating a configuration of the other displacement detecting apparatus according to this embodiment. Constituent elements of displacement detecting apparatus 201 in FIG. 3 which perform the same operations as performed by displacement detecting apparatus 200 in FIG. 2 are assigned with the same numerical references, and the same descriptions thereof are not repeated.

CPU 221 controls operations of the respective units. CPU 221 includes, for example, a non-volatile memory having a program stored therein, a volatile memory which is a transitory storage area for executing the program, an input and output port, a processor for executing the program, and the like.

Corrector 270 corrects displacement regarding the plurality of measurement points detected by detector 230, based on at least one reference measurement point among the plurality of measurement points detected by detector 230. More specifically, corrector 270 corrects displacement of other measurement points, based on displacement at a fixed measurement point set on bridge 102 in the captured images, and stores the displacement of the other measurement points in memory 260. The fixed measurement point is, for example, a point which is assumed to have the least displacement among the measurement points.

Extractor 241 extracts spatial principal components which are spatially displaced at the same time through principal component analysis on displacement at the plurality of time points obtained at the plurality of measurement points, and stores the spatial principal components in memory 260.

[1-2. Operations]

[1-2-1. Operation in the Case where No Correction is Made]

Figure 4:
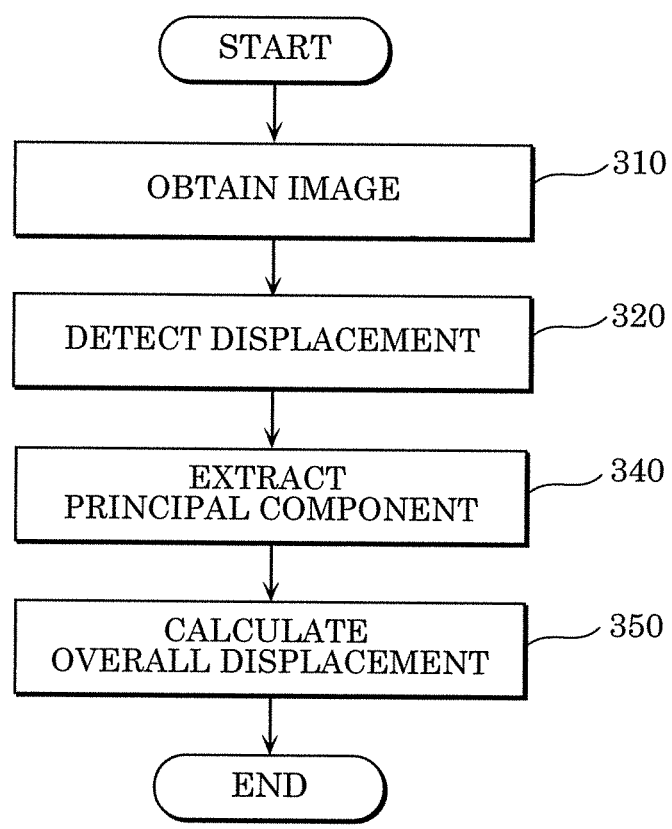
FIG. 4 is a flowchart indicating operations performed by the displacement detecting apparatus according to the embodiment.

FIG. 4 is a flowchart indicating operations performed by displacement detecting apparatus 200 according to this embodiment.

(Step 310)

CPU 220 obtains captured images. CPU 220 obtains the captured images of bridge 102 captured by camera 101 in a predetermined period via input and output I/F, and stores the captured images in memory 260.

(Step 320)

CPU 220 causes detector 230 to detect temporal displacement at the plurality of measurement points set on bridge 102. Detector 230 takes out the plurality of captured images stored in memory 260 in the time order of the captured images, and detects displacement of bridge 102 for each captured image. Detector 230 stores the detected displacement in memory 260 (a detecting step).

(Step 340)

CPU 220 causes extractor 240 to extract spatial principal components with respect to displacement at the plurality of measurement points detected by detector 230. Extractor 240 reads the displacement at the plurality of measurement points stored in memory 260, and extracts the spatial principal components. Extractor 240 stores the extracted principal component in memory 260 (a principal component extracting step).

(Step 350)

CPU 220 causes calculator 250 to calculate overall displacement indicating entire bridge 102, using the principal components extracted by extractor 240. Calculator 250 reads the principal components stored in memory 260, calculates the overall displacement of entire bridge 102, and stores the overall displacement in memory 260. CPU 220 outputs the overall displacement stored in memory 260 via input and output I/F 210 (a calculating step).

[1-2-2. Operation in the Case where Correction is Made]

Figure 5:
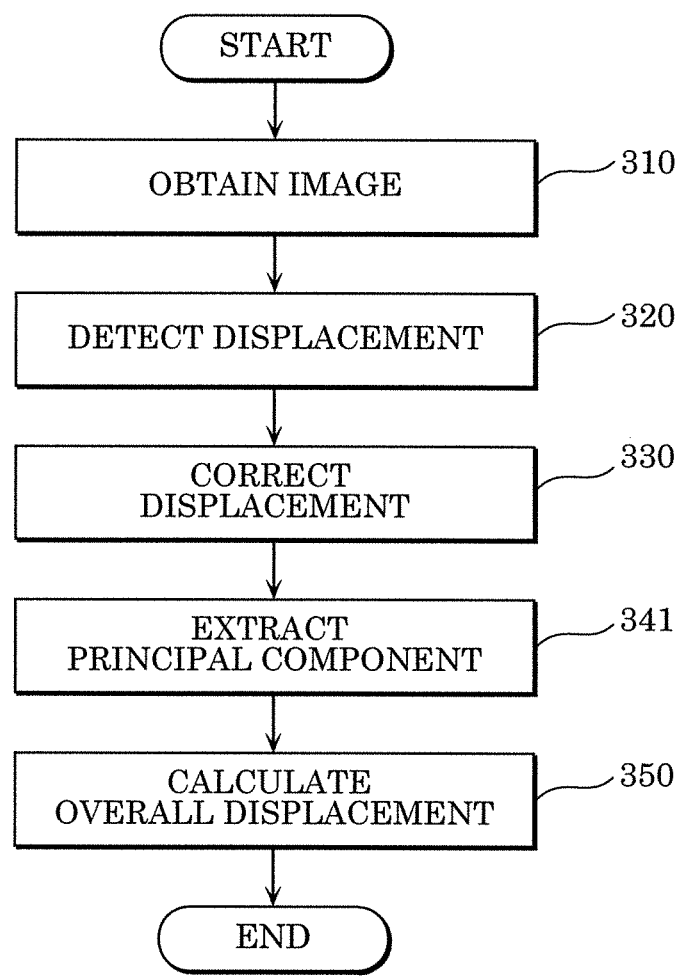
FIG. 5 is a flowchart indicating operations performed by the other displacement detecting apparatus according to the embodiment.

FIG. 5 is a flowchart indicating operations performed by another displacement detecting apparatus according to this embodiment. FIG. 5 indicates operations performed by displacement detecting apparatus 201.

In FIG. 5, the steps in which the same operations as those in the flowchart of FIG. 4 are performed are assigned with the same numerical references, and the same descriptions thereof are not repeated.

(Step 330)

CPU 220 causes corrector 270 to correct displacement at the plurality of measurement points detected by detector 230. Corrector 270 reads temporal displacement at the plurality of measurement points stored in memory 260, and corrects the displacement of each measurement point based on a structure included in the plurality of captured images. Corrector 270 stores the corrected displacement in memory 260.

(Step 341)

CPU 220 causes extractor 241 to extract spatial principal components with respect to displacement at the plurality of measurement points corrected by corrector 270. Extractor 241 reads the displacement at the plurality of measurement points stored in memory 260, and extracts the spatial principal components. Extractor 241 stores the extracted principal component in memory 260.

It is to be noted that the processing in Steps 330 and 341 may be performed according to mathematically-equivalent different procedures, or, as a result, may be performed collectively as a unified procedure.

[1-2-3. Example of Operations]

Here, an example of operations performed by displacement detecting apparatus 201 is described.

As illustrated in FIG. 1, CPU 221 stores a plurality of images of bridge 102 captured by camera 101 in memory 260 via input and output I/F 210.

Figure 6A:
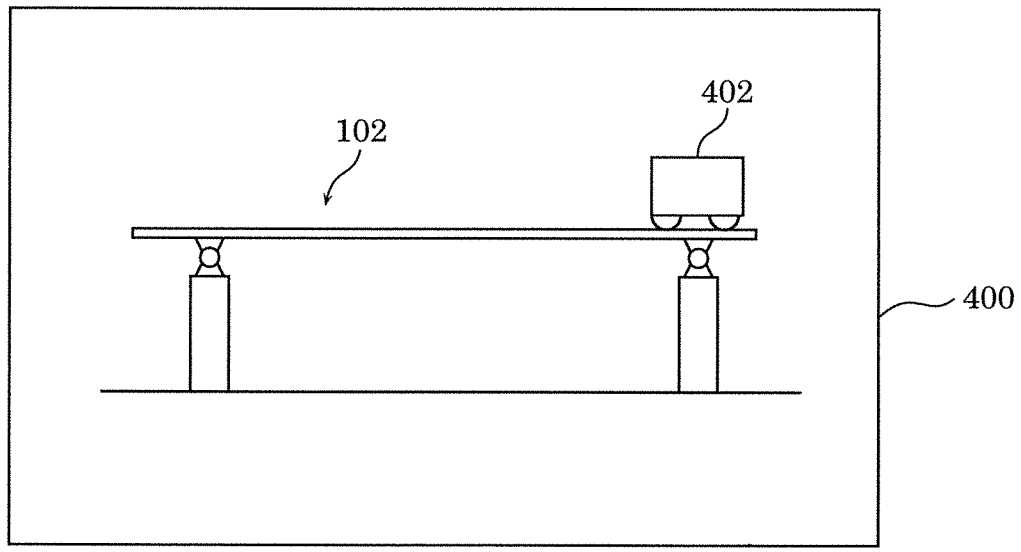
FIG. 6A is a diagram illustrating an example of a captured image of a bridge.
Figure 6B:
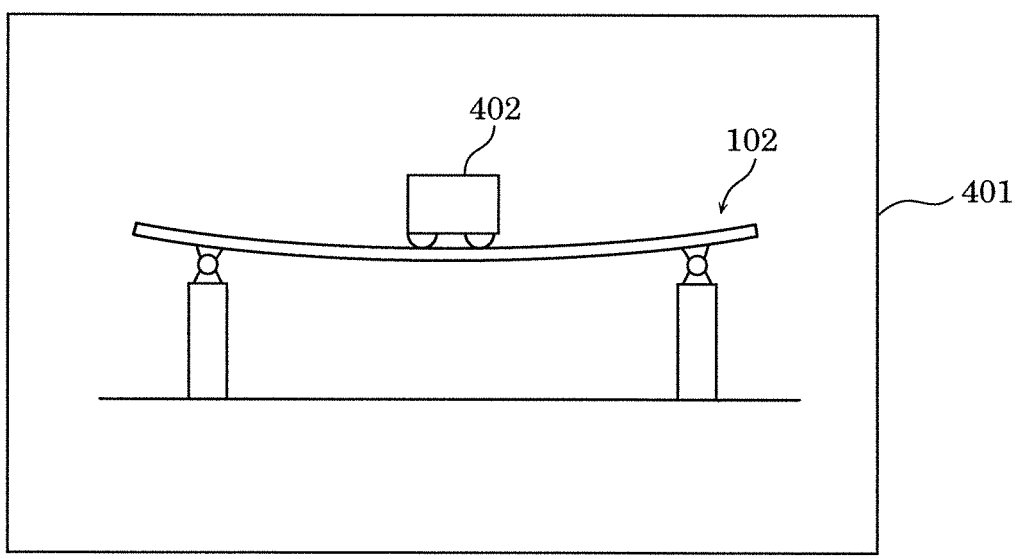
FIG. 6B is a diagram illustrating another example of a captured image of a bridge.

FIG. 6A illustrates an example of a captured image of bridge 102. In addition, FIG. 6B illustrates an example of a captured image of bridge 102. Captured image 400 and captured image 401 are images of bridge 102 captured at different time points. Captured images 400 and 401 indicate that vehicle 402 which functions as a load is present on bridge 102. In captured image 400, vehicle 402 is on a leg of bridge 102, and no displacement is made on bridge 102. On the other hand, in captured image 401, vehicle 402 is present around the center of bridge 102, and displacement is made on bridge 102. In this way, an object (such as vehicle 402) different from bridge 102 may be included in the captured image.

Detector 230 detects bridge 102 present in the captured image, using a known image recognition technique. Detector 230 detects the coordinates of each of measurement points set on detected bridge 102.

Figure 7:
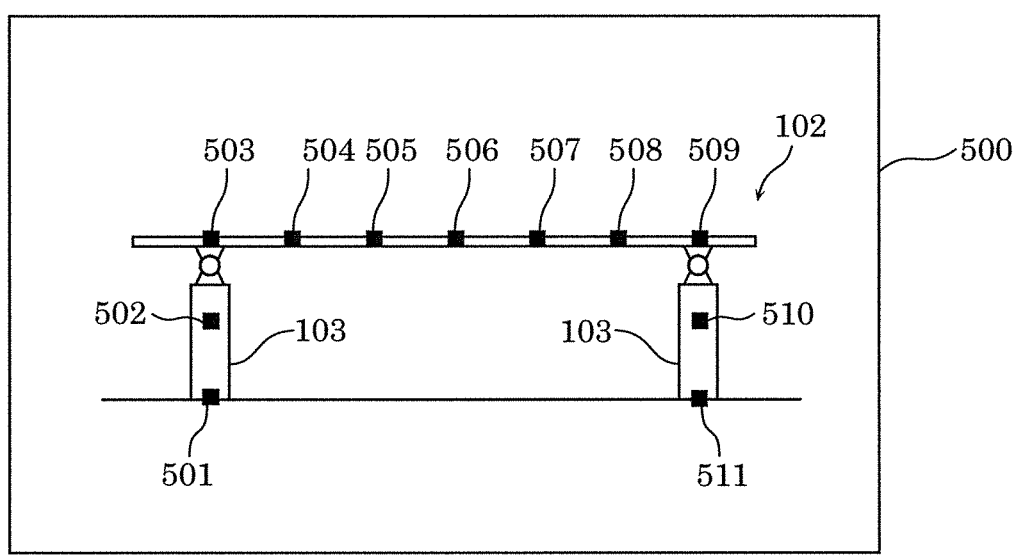
FIG. 7 is a diagram illustrating an arrangement example of measurement points set on the bridge.

FIG. 7 is a diagram illustrating an arrangement example of measurement points set on bridge 102.

In FIG. 7, black rectangles 501 to 511 indicate the measurement points set on bridge 102. The measurement points may be set by a user in advance, or may be set after bridge 102 is automatically detected using image recognition. In FIG. 7, the respective measurement points are set at approximately equal intervals, but advantageous effects of the present embodiment can be obtained even when the measurement points are set at unequal intervals. Here, in this embodiment, at least one measurement point among the plurality of measurement points is set as a fixed measurement point. The fixed measurement point is a measurement point which is most unlikely to be affected by weight etc. compared to the other measurement points, and thus has small displacement. In this embodiment, the following fixed measurement points are used: measurement points 501 and 511 which are provided on legs 103 of bridge 102 and are close to contact points with bridge abutment (not illustrated) provided in the ground for supporting legs 103.

Detector 230 takes out the plurality of captured images stored in memory 260 in the time order of the captured images, and detects displacement of bridge 102 for each captured image. Detector 230 detects, for example, displacement at the respective measurement points between captured image 400 and captured image 401. It is to be noted that detector 230 can use, as the method for detecting displacement in a captured image, one of general displacement detecting methods represented by (i) correlation methods such as block matching, normalized cross correlation, phase correlation, (ii) a sampling moiré method, (iii) a feature point tracking method, and (iv) a laser speckle correlation method. The displacement detection may be performed in units of pixels or sub-pixels.

FIG. 8 is a diagram indicating examples of displacement detected by detector 230. FIG. 8 indicates the position coordinates (x, y) of each of measurement points 501 to 511 in captured images (Frame 1, Frame 2, Frame 3, ... Frame n) of bridge 102 captured in a predetermined period.

Here, the position coordinates (x, y) of the i-th measurement point Pi in captured image Frame t captured at time t is denoted as Pi (x, y, t). In addition, the displacement of the i-th measurement point Pi in Frame t is denoted as Di (x, y, t). The displacement Di (x, y, t) is a difference between position coordinates Pi of a measurement point in a captured image and position coordinates Pi of a measurement point in a different captured image. In this embodiment, it is assumed that i=1 to 11 is satisfied, and that measurement points P1 to P11 correspond to measurement points 501 to 511.

For example, displacement Di (x, y, t) can be calculated according to the expression below in which position coordinates Pi (x, y, t) between temporally adjacent captured images are used.

$$Di(x,y,t)=Pi(x,y,t)-Pi(x,y,t-1) \quad \text{(Math. 1)}$$

In addition, displacement Di (x, y, t) may be calculated according to the expression below, by determining, as a captured reference image, an image such as a starting captured image, a captured image in which an object is in a stable state, or another one, and using the position coordinates of the captured reference image and the position coordinates of each of the captured images.

$$Di(x,y,t)=Pi(x,y,t)-Pi(x,y,0) \quad \text{(Math. 2)}$$

Here, Pi (x, y, 0) is position coordinates in the captured reference image.

It is to be noted that detector 230 corrects image distortion of an imaging optical system as necessary. In addition, when the ratios between displacement on the captured image and displacement on a real space vary due to differences in real space distance from the imaging positions of camera 101 to the respective measurement points on bridge 102, detector 230 rescales the displacement so as to equalize the ratios as necessary. Such correction may be performed on captured images, or may be performed on calculated displacement.

Conceivable examples include an example of including a scaler for rescaling the displacement at each of the plurality of measurement points detected by detector 230, so that the ratio of distance of actual displacement between the plurality of measurement points is reflected. In this case, for example, the scaler may store the coordinates on the real space of each measurement point, and may perform the rescaling using the stored coordinates on the real space.

Corrector 270 reads displacement Di (x, y, t) of each measurement point stored in memory 260. Corrector 270 regards, as a reference, displacement D1 (x, y, t) of predetermined fixed measurement point P1 (measurement point 501) among the measurement points, and subtracts, for each captured image, displacement D1 (x, y, t) of predetermined fixed measurement point P1 from displacement Di (x, y, t) of each measurement point. In this way, it is possible to remove influence of image displacement which is made when the x and y directions of the camera are changed during imaging.

Furthermore, corrector 270 may set fixed measurement point P11 (measurement point 511) different from fixed measurement point P1, and may rotationally transform the x, y coordinate values of displacement Di (x, y, t) of each measurement point regarding, as the center, the position of fixed measurement point 1, so that the value of displacement D11 (x, y, t) of fixed measurement point P11 approximates to 0. In this way, it is possible to remove influence of displacement of each captured image due to change in the rotation (role) direction of the camera during the imaging. Corrector 270 stores each corrected displacement in memory 260.

It is to be noted that a fixed measurement point may be set on bridge 102, or may be set on anything else. For example, a fixed measurement point may be set on a still object (building or the like) in the background of a captured image. In addition, it is also good to increase the number of fixed measurement points, and optimize a parallel displacement correction amount and a rotational correction amount in the x, y directions of each measurement point, so as to minimize a total displacement of the respective fixed measurement points. In this way, it is possible to reduce the influence on displacement detection placed due to change in rotation, orientation, etc. of the camera used in imaging. In addition, it is also good to analyze motions in frame images captured at different time points and detect a dominant motion (global motion) in each entire image, so as to determine a point in the image that follows the dominant motion as a fixed measurement point.

When displacement in a captured image made due to orientation, rotation, or the like of a camera is likely to be within an allowable range, it is also good to skip displacement correction by corrector 270.

Extractor 241 determines, to be u (t), characteristic displacement which is a combination of displacement at time t of a plurality of measurement points with respect to displacement Di (x, y, t) at time t, and calculates principal component $e_i$ (i=1 to n, n is the number of kinds of principal components). Next, extractor 241 stores m (m≤n) kinds of principal components among the extracted n kinds of principal components in the memory. The m kinds of principal components to be stored may be specified starting from the principal component having the largest eigen value, or may be set using a cumulative contribution ratio. Alternatively, the principal components having an eigen value at a predetermined rank may be selected. As the method for calculating the principal components, it is possible to use a general method such as diagonalization of a covariance matrix. Extractor 240 stores the calculated m kinds of principal components in memory 260.

Here, for example, descriptions are given assuming that m is 5, and that extractor 241 stores a kind of principal components ranked at top five in descending order of the magnitude of eigen values in the memory.

Each of FIG. 9A to 9E is a diagram illustrating a visual example of a corresponding kind of principal components ranked at top five in the descending order of the magnitude of eigen values. The corresponding kind of principal components are one of the kinds of principal components (first, second, third, fourth, and fifth kinds of principal components). In each of FIG. 9A to 9E, the corresponding first, second, third, fourth, or fifth kind of principal components in overall displacement are separated for each measurement point, and vectors indicating the corresponding first, second, third, fourth, or fifth kind of principal components are displayed by being superimposed on the corresponding captured image of bridge 102.

Figure 9A:
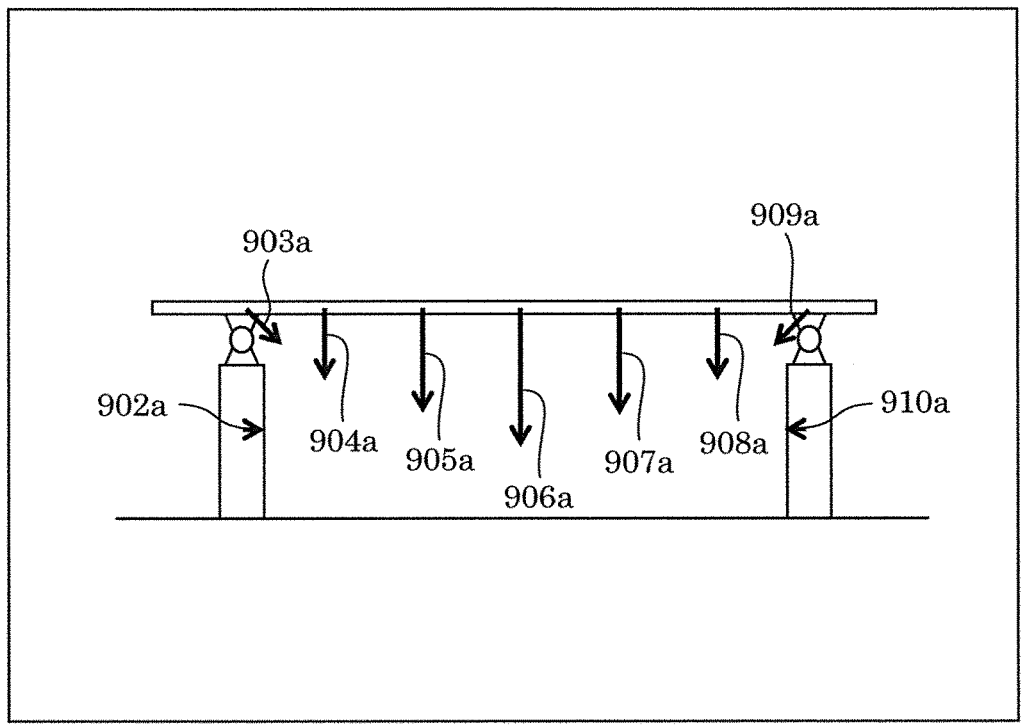
FIG. 9A is a diagram illustrating an example of visualized first principal components.
Figure 9B:
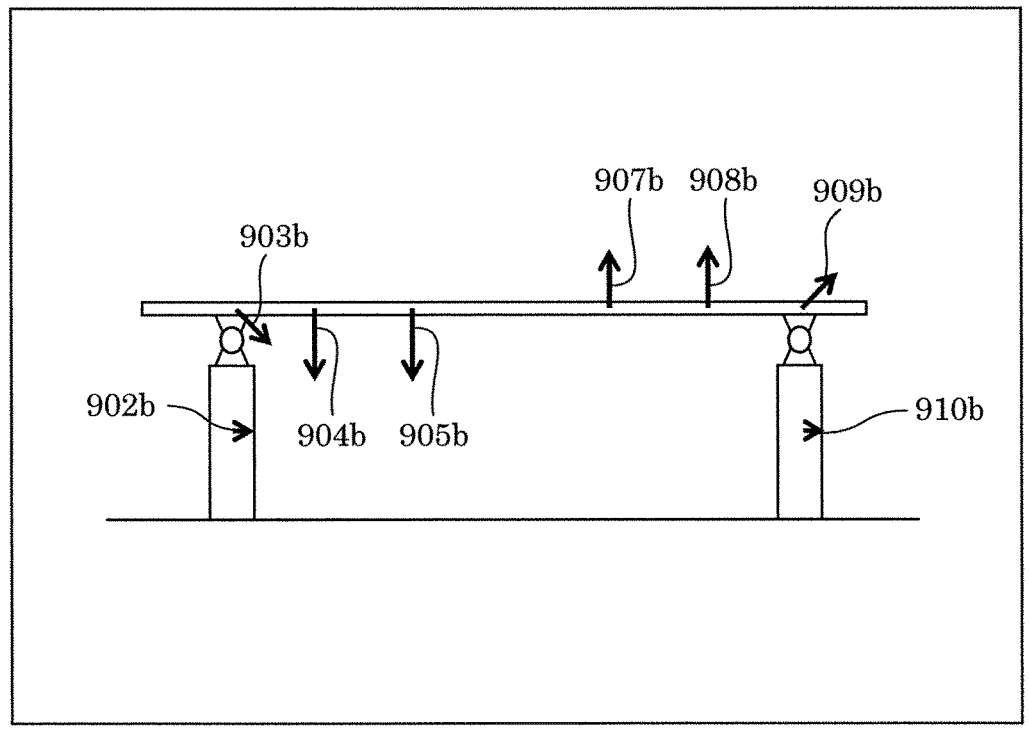
FIG. 9B is a diagram illustrating an example of visualized second principal components.
Figure 9C:
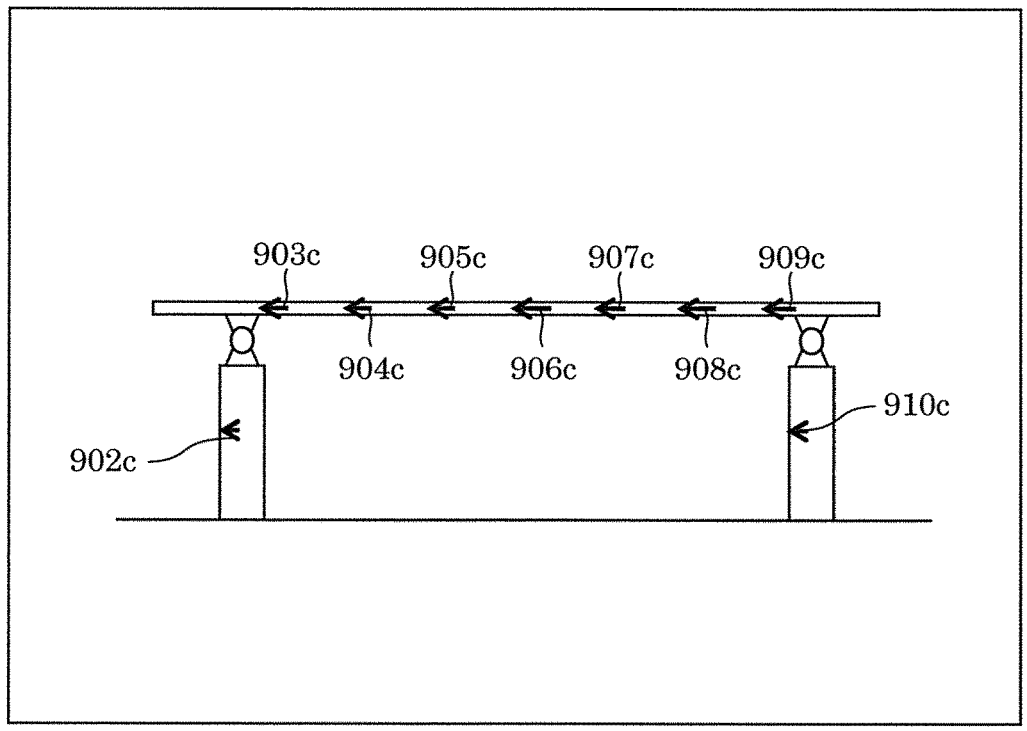
FIG. 9C is a diagram illustrating an example of visualized third principal components.
Figure 9D:
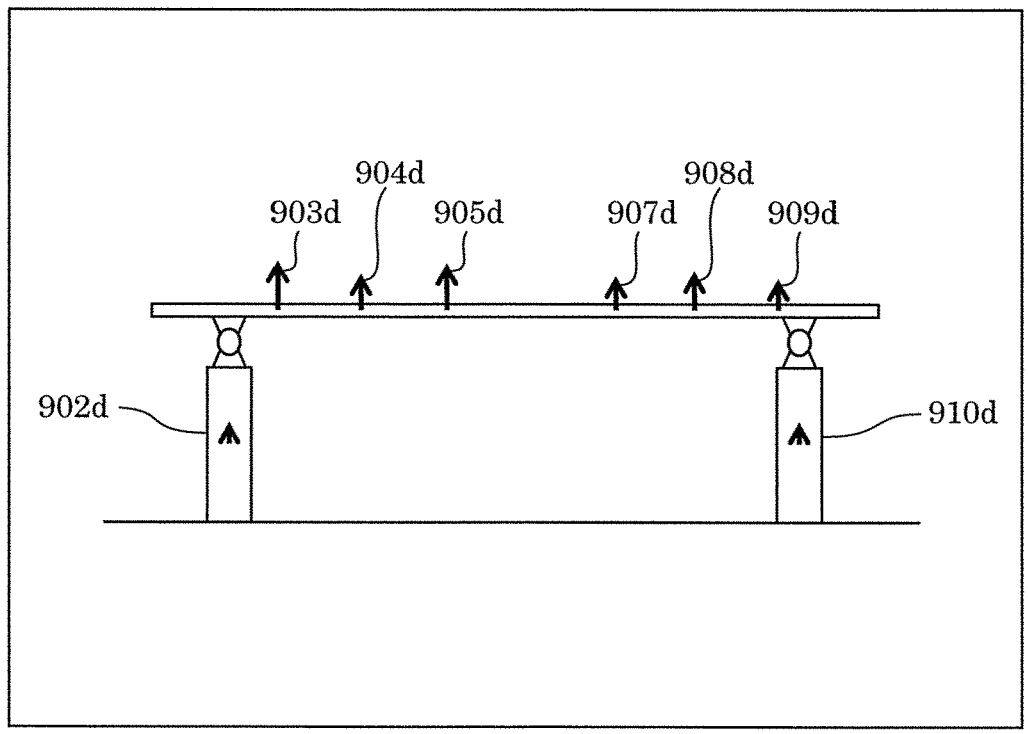
FIG. 9D is a diagram illustrating an example of visualized fourth principal components.
Figure 9E:
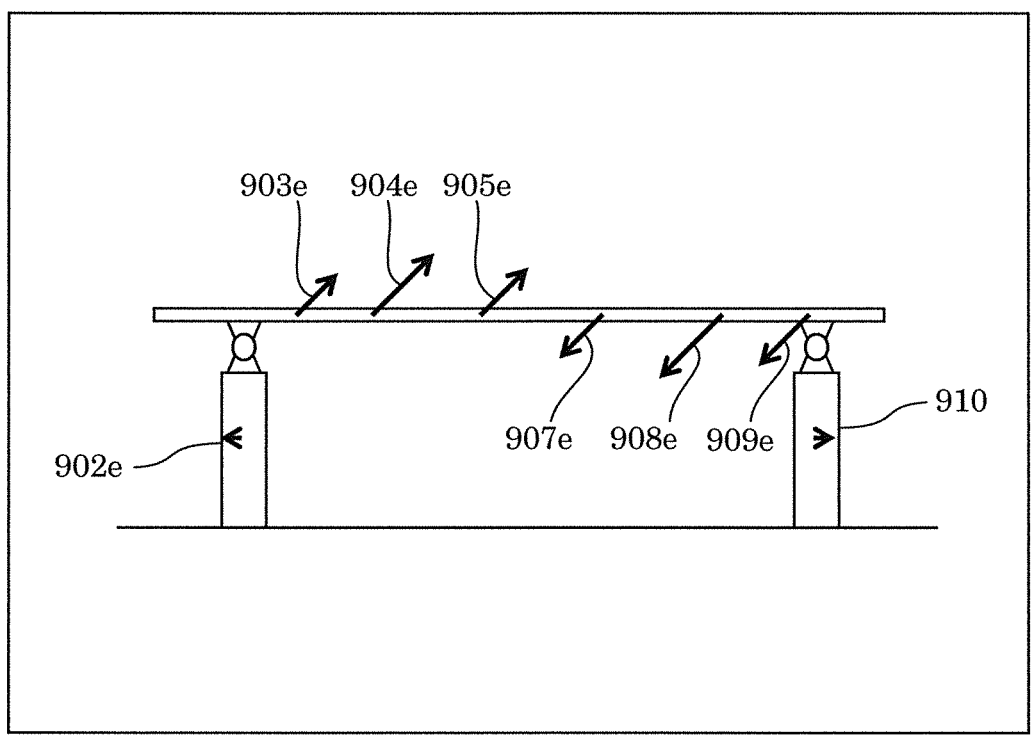
FIG. 9E is a diagram illustrating an example of visualized fifth principal components.

In FIG. 9A, vectors 902a to 910a indicate a first kind of principal components at measurement points 502 to 510. Likewise, in FIG. 9B, vectors 902b to 910b indicate a second kind of principal components at measurement points 502 to 510. Likewise, in FIG. 9C, vectors 902c to 910c indicate a third kind of principal components at measurement points 502 to 510. Likewise, in FIG. 9D, vectors 902d to 910d indicate a fourth kind of principal components at measurement points 502 to 510. Likewise, in FIG. 9E, vectors 902e to 910d indicate a fifth kind of principal components at measurement points 502 to 510. It is to be noted that, in each diagram, each measurement point without display of a vector indicates that the extracted magnitude of the vector is 0.

As is known from these diagram, these five kinds of principal components indicate characteristic displacement on bridge 102 which is the object.

Calculator 250 synthesizes overall displacement u' (t) from m principal components stored in memory 260. Calculator 250 calculates it according to $u'(t)=\Sigma_i \{a_i(t) e_i\}$.

Here, $a_i(t)$ is a coefficient to $e_i$, and $a_i(t)$ is set so as to minimize the result of $|u'(t)-u(t)|^2$. Output unit 207 outputs the calculated overall displacement u' (t) as displacement Di' (x, y, t) of each measurement point on bridge 102.

CPU 220 displays the overall displacement u' (t) calculated by calculator 250 on a display unit (not illustrated) via input and output I/F 210.

Figure 10:
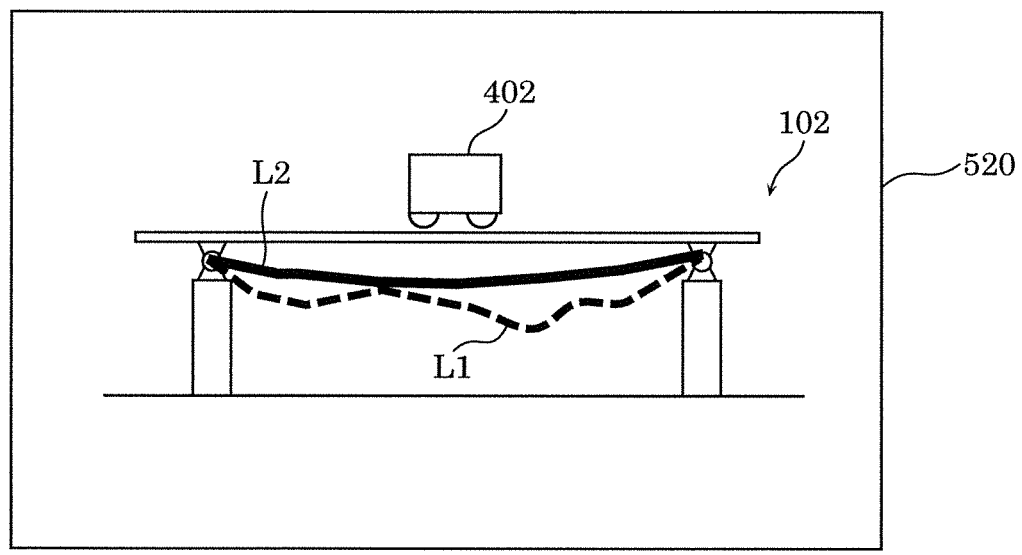
FIG. 10 is a diagram illustrating detected displacement and the calculated overall displacement of the object.

FIG. 10 is a diagram illustrating detected displacement and calculated overall displacement of bridge 102. In FIG. 10, dotted line L1 shows displacement Di (x, y, t) at a measurement point. In addition, solid line L2 shows overall displacement u' (t) which is an overall displacement of bridge 102. As illustrated in FIG. 10, the overall displacement of bridge 102 caused by vehicle 402 can be shown more accurately by solid line L2 than dotted line L1. Stated differently, solid line L2 shows the overall displacement with reduced influence of error components.

It is to be noted that, when there is influence of abrupt noise in the extraction of the principal components, it is also good to remove the noise in advance, or reduce the influence of the noise through robust principal component analysis.

[1-3 Advantageous Effects]

As described above, in the displacement detecting apparatus according to the present embodiment, (i) detector 230 detects the temporal displacement in each of the measurement points set on bridge 102, in the images captured in the predetermined period, (ii) extractor 240 extracts the spatial principal components with respect to the temporal displacement at each of the plurality of measurement points, and (iii) calculator 250 calculates the overall displacement of bridge 102, based on the extracted principal components.

In this way, by assuming that the displacement at the plurality of measurement points at which displacement has been measured at the same time is the overall displacement and extracting the spatial principal components of the overall displacement, it is possible to obtain the characteristics of the overall displacement specific to the object without using the geometric structure of the object or previously learned knowledge regarding dynamic characteristics.

Accordingly, the convenient and low-cost configuration makes it possible to synthesize displacement based on the characteristics of the overall displacement of the object, reduce detection error in the displacement at each of the measurement points, and detect the displacement more accurately.

In addition, by imaging a large area including measurement points and a fixed point on the object using a camera, it is possible to detect a large number of displacement of the object while reducing the influence of camera shake.

Variations of the Embodiment

Hereinafter, the embodiment has been described as an example of a technique disclosed in the present application. However, the technique according to the present disclosure is not limited thereto, and is applicable to embodiments obtainable by performing modification, replacement, addition, omission, etc. In addition, it is also possible to obtain a new embodiment by arbitrarily combining the constituent elements described in the above embodiment.

Hereinafter, other variations of the embodiment are described below as examples.

As illustrated in FIG. 1, imaging apparatus 101 may be a body separate from displacement detecting apparatus 200, or may be included in displacement detecting apparatus 200. In addition, captured images may be monochrome images or color images (including multi spectral images). In addition, imaging apparatus 101 may output, as images, arrangement data obtained by sensing the object using a distance measuring sensor or an acceleration sensor instead of a general camera. In other words, captured images for use by displacement detecting apparatus 200 may be, for example, acceleration images indicating acceleration or speed images indicating speed. For example, when the captured images to be used by displacement detecting apparatus 200 are acceleration images, detector 230 may calculate displacement to be detected such that the displacement is represented using acceleration, and extractor 240 may extract characteristic displacement to be extracted such that the characteristic displacement is represented using acceleration. For example, when the captured images to be used by displacement detecting apparatus 200 are speed images, detector 230 may calculate displacement to be detected such that the displacement is represented using speed, and extractor 240 may extract characteristic displacement to be extracted such that the displacement is represented using speed.

Although imaging apparatus 101 is configured with a single camera in this embodiment, a plurality of cameras may be used to capture images of the same object. In this case, it is possible to perform the processes up to Step 330 on each of images captured synchronously by the respective cameras, and to perform the processes of Step 340 and the following steps on a group of all of the displacement amounts obtained from the images captured by the cameras. In this way, it is possible to accurately calculate the overall displacement on the object whose images cannot be captured by a single camera due to the shape or range of the object.

In addition, although displacement $Di (x, y)$ is detected in this embodiment, it is also good to obtain distance images (depth images) and detect three-dimensional displacement $Di (x, y, z)$. By executing the same procedure as in the above embodiment after the detection of the displacement, it is possible to obtain highly accurate three-dimensional displacement. As a depth image obtaining method for use here, it is possible to perform any of general depth image obtaining methods such as: a stereo method using a plurality of stereo or multi-view cameras for synchronous imaging; a pattern projecting method; a method using time-of-flight (TOF) cameras; and a method using laser displacement meters.

In addition, although the bridge is taken as an example of an object in this embodiment, it is possible to obtain similar advantageous effects when the object is a structure such as a building, a steel tower, a chimney, a wall surface, a floor covering material, a plate material, a steel-frame scaffolding, a road surface, a rail road, a vehicle body, or the like.

FIG. 11 is a diagram illustrating an example of visualized five kinds of principal components in the case where the object is electricity-transmitting steel tower 110. The five kinds of principal components are first principal components to fifth principal components ranked top five for each kind in the descending order of the magnitude of eigen values.

In the diagram, first principal components 111 of overall displacement are visualized as a group of vectors at separate measurement points (the black rectangles in electricity-transmitting steel tower 110); second principal components 112 of overall displacement are visualized as a group of vectors at the separate measurement points; third principal components 113 of overall displacement are visualized as a group of vectors at some of the separate measurement points; fourth principal components 114 of overall displacement are visualized as a group of vectors at some of the separate measurement points; and fifth principal components 115 of overall displacement are visualized as a group of vectors at the separate measurement points. However, in each diagram, each measurement point without display of a vector indicates that the extracted magnitude of the vector is 0.

As is known from the diagram, these five kinds of principal components indicate characteristic displacement on electricity-transmitting steel tower 110 which is the object.

In addition, the wavelength zone of light for use in imaging by imaging apparatus 101 may be ultraviolet rays, near infrared rays, or far infrared rays.

In addition, it is also good to visualize the principal components of the displacement calculated by calculator 250. For example, displacement detecting apparatus 200 may further include a superimposed image generator which generates a superimposed image by superimposing an image based on displacement calculated by calculator 250 onto at least one of the plurality of captured images.

For example, as illustrated in each of FIGS. 9A to 9E, the superimposed image generator generates a superimposed image in which the vectors indicating the corresponding first, second, third, fourth, or fifth kind of principal components are superimposed on a captured image of bridge 102 separately for the corresponding ones of the measurements points. By displaying the vectors in this way, it is possible to facilitate recognition of the spatial distribution of the overall displacement of object 102. In the case of three-dimensional representation, similar display can be realized using three-dimensional display. It is to be noted that the processes starting with the process performed by calculator 250 may be skipped when only the characteristic displacement needs to be extracted.

In addition, it is also good to display temporal variation (temporal variation of $a_i(t)$) in component strength for each of the principal components. In this case, for example, calculator 250 calculates variation in temporal strength of each of the principal components to be calculated. Furthermore, frequency analysis may be performed on the variation and then the result may be displayed. In this case, for example, calculator 250 calculates frequency characteristics of variation in temporal strength of each of the principal components to be calculated. In this way, it is possible to recognize the temporal characteristics of behaviors as the entirety of the object for each of the components in the displacement. When only such display is required, it is also good to skip synthesis of the displacement at Step 350 and the following steps.

In addition, it is also good to detect the position and speed of a load source (for example, vehicle 402 in FIG. 6A) using captured images, and perform image recognition regarding the kind of the load source. By identifying the kind of the load source, it is possible to associate it with a load of the load source. In this way, it is possible to analyze the relationship between the magnitude, position, speed, and displacement of the load, based only on the images.

In addition, although displacement is detected from captured images to calculate the displacement of the entirety of the object in this embodiment, it is also good to replace the displacement with speed (differential amount of displacement) or acceleration (two-floor differential amount of displacement), and apply similar procedures thereto. In the case of replacing the displacement with speed, it is possible to calculate the spatial distribution of the speed of the entirety of the object, and obtain highly accurate speed distribution. This holds true for acceleration. The speed image obtained by calculating the speed of the object may be calculated by differentiating the displacement obtained from a normal image, or may be directly obtained using a laser Doppler meter. In addition, the acceleration image obtained by calculating the acceleration of the object may be calculated by differentiating the displacement obtained from a normal image. Alternatively, for example, it is also good to mount acceleration sensors on measurement points of the object, and obtain directly from a value measured by each acceleration sensor. In the case of using acceleration images, the configuration of displacement detecting apparatus 200 is applied thereto.

In addition, calculator 250 may spatially interpolate the calculated displacement of the entirety of the object, and estimate the displacement at each of points other than the measurement points.

In addition, corrector 270 may correct captured images or displacement detected by detector 230 such that the real scales of the structure in the captured images are equalized.

In the case of correcting the captured images, corrector 270 performs correction before detector 230 detects the displacement.

It is to be noted that the embodiment and the variations thereof are provided for illustrating the technique according to the present disclosure, and thus various kinds of modification, replacement, addition, omission, etc. can be performed within the scope of the claims and the equivalents thereof.

INDUSTRIAL APPLICABILITY

The present disclosure is applicable to measurement, evaluation, analysis, diagnosis, test, or the like of dynamic behaviors of a structure.

What is claimed is:

1. A displacement detecting apparatus, comprising:
a detector which detects displacement of each of a plurality of measurement points which have been set on an object, using a plurality of images of the object captured at a plurality of time points, the displacement being spatial displacement over time;
an extractor which extracts characteristic displacement specific to vectors indicating displacement at a plurality of measurement points of the object, based on the displacement detected by the detector;
a calculator which calculates overall displacement indicating displacement of an entirety of the object, from the vectors indicating the displacement at the plurality of measurement points extracted by the extractor; and
a superimposed image generator which generates a superimposed image in which an image of the vectors based on the displacement calculated by the calculator is superimposed onto at least one of the plurality of captured images.

2. The displacement detecting apparatus according to claim 1,
wherein the extractor performs the extraction by extracting one or more principal components through principal component analysis on the displacement detected by the detector.

3. The displacement detecting apparatus according to claim 2,
wherein the calculator performs the calculation by synthesizing at least two of the one or more principal components except for at least one lowermost principal component in descending order of magnitude of eigen values.

4. The displacement detecting apparatus according to claim 2,
wherein the calculator performs the calculation by calculating variation in temporal strength of each of the principal components to be calculated.

5. The displacement detecting apparatus according to claim 2,
wherein the calculator performs the calculation by calculating frequency characteristics of variation in temporal strength of each of the principal components to be calculated.

6. The displacement detecting apparatus according to claim 2,
wherein the superimposed image generator generates the superimposed image in which the image which is based on the one or more principal components extracted by the extractor is superimposed onto the at least one of the plurality of captured images.

7. A displacement detecting apparatus, comprising:

a detector which detects displacement of each of a plurality of measurement points which have been set on an object, using a plurality of images of the object captured at a plurality of time points, the displacement being spatial displacement over time;

an extractor which extracts one or more principal components through principal component analysis on the displacement detected by the detector; and a superimposed image generator which generates a superimposed image in which an image based on the one or more principal components extracted by the extractor is superimposed onto at least one of the plurality of captured images.

8. The displacement detecting apparatus according to claim 7, the superimposed image generator generates the superimposed image in which vectors of the one or more principal components are superimposed on the at least one of the plurality of captured images separately for corresponding ones of measurement points.

9. A displacement detecting method performed by a displacement detecting apparatus including a detector, an extractor, a calculator, and a superimposed image generator, the displacement detecting method comprising:

detecting displacement of each of a plurality of measurement points which have been set on an object, using a plurality of images of the object captured at a plurality of time points, the displacement being spatial displacement over time, the detecting being performed by the detector;

extracting characteristic displacement specific to vectors indicating displacement at a plurality of measurement points of the object, based on the displacement detected in the detecting, the extracting being performed by the extractor;

calculating overall displacement indicating displacement of an entirety of the object, from the vectors indicating the displacement at the plurality of measurement points extracted in the extracting, the calculating being performed by the calculator; and generating a superimposed image in which an image of the vectors based on the overall displacement calculated in the calculating is superimposed onto at least one of the plurality of captured images.

10. The displacement detecting method according to claim 9, wherein the extracting is extracting one or more principal components through principal component analysis on the displacement detected in the detecting.

11. The displacement detecting method according to claim 10, wherein the generating is generating the superimposed image in which the image based on the one or more principal components extracted in the extracting is superimposed onto the at least one of the plurality of captured images.

* * * * *